US011299231B2

(12) United States Patent
Tsutsui et al.

(10) Patent No.: US 11,299,231 B2
(45) Date of Patent: Apr. 12, 2022

(54) STEERING STRUCTURE FOR SADDLE RIDING VEHICLE

(71) Applicant: HONDA MOTOR CO., LTD., Tokyo (JP)

(72) Inventors: Masayuki Tsutsui, Wako (JP); Kohei Suzuki, Wako (JP); Takafumi Nakanishi, Wako (JP); Yuichi Yokoyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 16/578,502

(22) Filed: Sep. 23, 2019

(65) Prior Publication Data
US 2020/0102047 A1 Apr. 2, 2020

(30) Foreign Application Priority Data
Sep. 28, 2018 (JP) .............................. JP2018-184414

(51) Int. Cl.
*B62K 21/18* (2006.01)
*B62K 21/12* (2006.01)
(Continued)

(52) U.S. Cl.
CPC .............. *B62K 21/18* (2013.01); *B62K 21/02* (2013.01); *B62K 21/12* (2013.01); *B62K 21/20* (2013.01); *B62K 25/16* (2013.01)

(58) Field of Classification Search
CPC ........ B62K 21/02; B62K 21/12; B62K 21/18; B62K 21/20; B62K 25/16; B62K 25/24; B62D 7/16
(Continued)

(56) References Cited

U.S. PATENT DOCUMENTS 9,828,057 B2 11/2017 Aoki
10,077,066 B2 9/2018 Mori et al.
(Continued)

FOREIGN PATENT DOCUMENTS

JP  04-169386   6/1992
JP  2009-179285  8/2009
(Continued)

OTHER PUBLICATIONS

Indian Office Action for Indian Patent Application No. 201914038478 dated Jan. 27, 2021.
(Continued)

*Primary Examiner* — Kevin Hurley
*Assistant Examiner* — Hosam Shabara
(74) *Attorney, Agent, or Firm* — Amin, Turocy & Watson, LLP

(57) ABSTRACT

A steering structure for a saddle riding vehicle includes a suspension arm, a head pipe supported by a tip portion of a suspension arm, a stem shaft pivotably inserted through the head pipe, a front fork structure body integrally pivotably connected to a lower end portion of the stem shaft, a handle support section disposed above the head pipe, a handle steerably supported by the handle support section, and a bending link configured to transmit a steering operation of the handle toward a front wheel, wherein the bending link has an upper end portion connected to a side of the handle and a lower end portion connected to a side of the front fork structure body.

6 Claims, 5 Drawing Sheets

(51) Int. Cl.
*B62K 21/02* (2006.01)
*B62K 25/16* (2006.01)
*B62K 21/20* (2006.01)

(58) Field of Classification Search
USPC .......................................................... 280/276
See application file for complete search history.

(56) References Cited

U.S. PATENT DOCUMENTS

2006/0061059 A1 3/2006 Lesage et al.
2015/0307153 A1 10/2015 Loni

FOREIGN PATENT DOCUMENTS

| JP | 2011-121435 | 6/2011 | |
|----|----|----|----|
| JP | 2011-143851 | 7/2011 | |
| JP | 2015-193310 | 11/2015 | |
| JP | 2016-179796 | 10/2016 | |
| WO | WO-2011089725 A1 * | 7/2011 | ............. B62K 25/24 |

OTHER PUBLICATIONS

Japanese Office Action for Japanese Patent Application No. 2018-184414 dated Jun. 29, 2021.

* cited by examiner

STEERING STRUCTURE FOR SADDLE RIDING VEHICLE

CROSS-REFERENCE TO RELATED APPLICATION

Priority is claimed on Japanese Patent Application No. 2018-184414, filed Sep. 28, 2018, the content of which is incorporated herein by reference.

BACKGROUND OF THE INVENTION

Field of the Invention

The present invention relates to a steering structure for a saddle riding vehicle.

Description of Related Art

In the related art, regarding a steering structure for a saddle riding vehicle, for example, Japanese Unexamined Patent Application, First Publication No. 2015-193310 discloses a structure in which a head pipe is supported by a tip portion of a suspension arm extending forward from a front section of the vehicle, a steered wheel is supported by front forks including a stem shaft fitted into the head pipe, and a steering operation of a handle is transmitted to the front forks using a rod extending parallel to a suspension arm.

SUMMARY OF THE INVENTION

However, in the case of the configuration in the related art, there is a need to dispose a head pipe for a steered wheel configured to steerably support front forks in a greatly forward offset state with respect to a head pipe for a handle configured to steerably support a handle, and the configuration cannot be easily mounted on a small-size vehicle.

An aspect of the present invention is directed to providing a steering structure for a saddle riding vehicle capable of minimizing an offset amount in a forward/rearward direction between a head pipe for a steered wheel and a head pipe for a handle and allowing the steering structure to be easily mounted on a small-size vehicle.

The present invention employs the following aspects.

(1) A steering structure for a saddle riding vehicle according to an aspect of the present invention includes a vehicle body frame; a suspension arm extending forward from a front section of the vehicle body frame; a head pipe supported by a tip portion of the suspension arm; a stem shaft pivotably inserted through the head pipe; a fork member integrally pivotably connected to a lower end portion of the stem shaft and configured to support a steered wheel; a head pipe for a handle that is supported by a front section of the vehicle body frame and that is disposed above the head pipe; a steering handle steerably supported by the head pipe for a handle; and a bending link configured to transmit a steering operation of the steering handle toward the steered wheel, wherein the bending link has an upper end portion connected to a side of the steering handle and a lower end portion connected to a side of the fork member.

(2) In the aspect of the above-mentioned (1), the lower end portion of the bending link may be connected to the fork member in front of the stem shaft.

(3) In the aspect of the above-mentioned (1) or (2), a link connecting bracket detachably attached to the fork member may be provided, and the lower end portion of the bending link may be connected to the link connecting bracket.

(4) In the aspect of the above-mentioned (1) to (3), the steering handle may be attached to an upper end portion of a stem shaft for a handle steerably inserted into the head pipe for a handle, an arm section extending forward may be provided on a lower end portion of the stem shaft for a handle, the upper end portion of the bending link may be connected to the arm section, and the lower end portion of the bending link may be connected to the fork member in front of the stem shaft.

(5) In the aspect of the above-mentioned (4), a support section of a headlight may be provided on the arm section.

(6) In the aspect of the above-mentioned (1) to (5), the suspension arm may include an upper arm and a lower arm, the bending link may be formed in a bent shape protruding forward when seen in a side view, and a front end portion of the upper arm may be pivotably connected to a front connecting section of the head pipe and is disposed so as to face a concave section formed by the bending link when seen in a side view.

(7) In the aspect of the above-mentioned (6), the bending link may connect an upper link and a lower link at a bent shaft, and the bent shaft may be disposed at a height at which it overlaps a front end portion of the upper arm in an axial direction of the stem shaft.

According to the aspect of the above-mentioned (1), since the head pipe for a handle is disposed above the head pipe configured to steerably support the fork member, in comparison with the case in which the head pipe for a handle is disposed behind the head pipe (the case in which positions in the upward/downward direction of the head pipe and the head pipe for a handle overlap each other), there is no need to greatly offset the head pipe and the head pipe for a handle in the forward/rearward direction, a compact structure in the forward/rearward direction is provided, and the structure can be easily mounted on a small-size vehicle.

According to the aspect of the above-mentioned (2), for example, in the configuration in which the bending link is connected to the fork member behind the stem shaft, while the head pipe is offset forward in order to secure a space for connecting to the bending link. On the other hand, according to the aspect of the above-mentioned (2), the head pipe can be disposed in a compact space by connecting the bending link to the fork member in front of the stem shaft.

According to the aspect of the above-mentioned (3), a degree of freedom of a connecting structure and an assembly method of the bending link with respect to the fork member can be increased.

According to the aspect of the above-mentioned (4), since the upper end portion of the bending link is connected to the arm section extending forward from the lower end portion of the stem shaft for a handle and the lower end portion of the bending link is connected to the fork member in front of the stem shaft, a vertical stroke of the steered wheel is easily secured, the bending link is easily reduced in size, and a compact structure of the vehicle can be easily achieved.

According to the aspect of the above-mentioned (5), reduction in the number of parts due to rationalization can be achieved by supporting the headlight using the arm section extending forward.

According to the aspect of the above-mentioned (6), since the front end portion of the upper arm is disposed to face the inside of the concave section formed by the bending link, the bending link can be disposed close to the head pipe using a dead space formed by the bending link, and a compact structure of the vehicle can be achieved.

According to the aspect of the above-mentioned (7), since a periphery of the bent shaft having a maximum bending depth of the bending link and a front end portion of the upper arm connected to the front connecting section of the head pipe are disposed at a height at which they overlap each other in the axial direction of the stem shaft, it becomes easier to dispose the bending link closer to the head pipe, and a compact surface of the vehicle can be achieved.

DETAILED DESCRIPTION OF THE INVENTION

Figure 5:
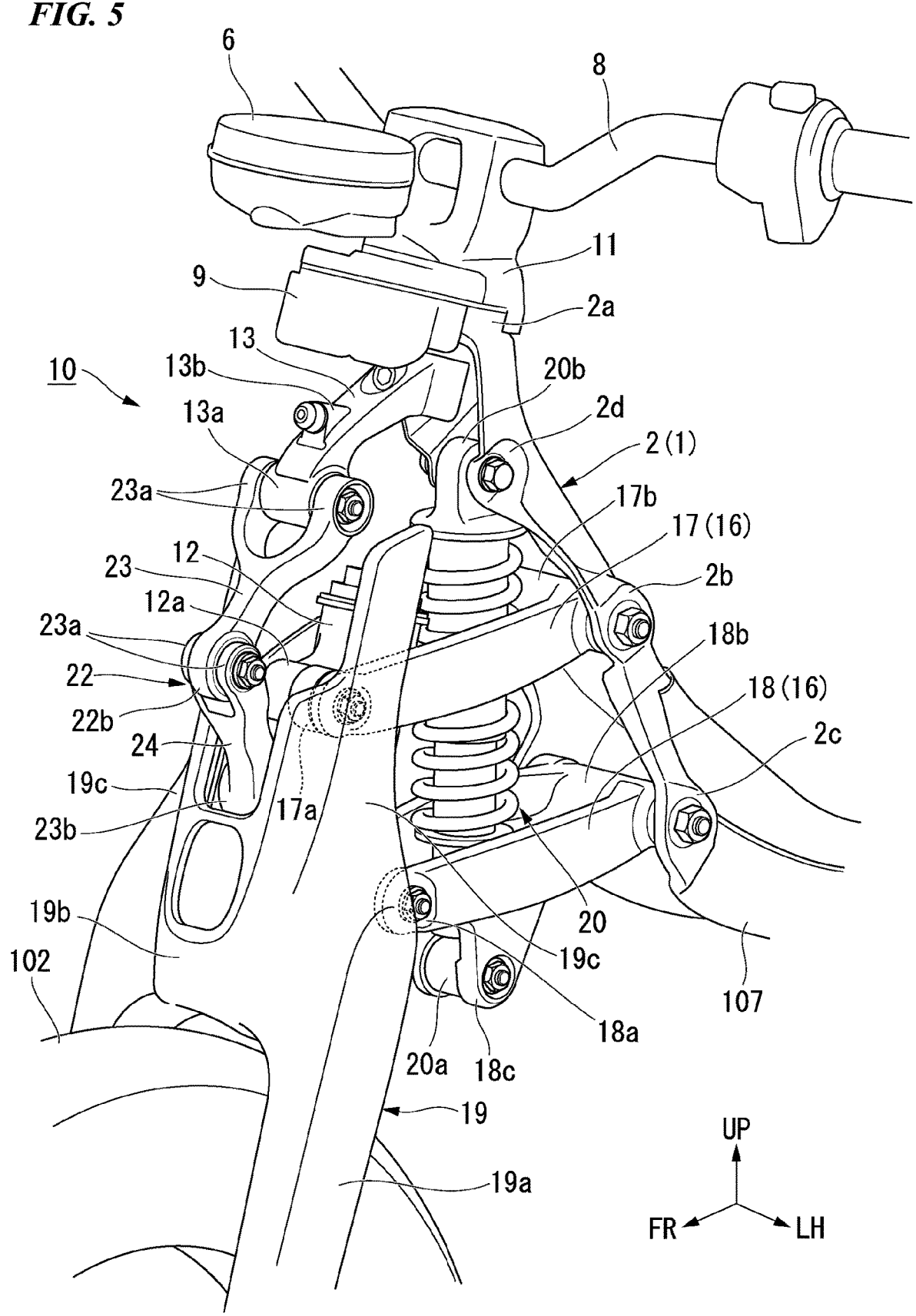
FIG. 5 is a perspective view of the front wheel suspension apparatus.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle, and a line CL indicates a line showing a lateral center of a vehicle body.
<Entire Vehicle>
A motorcycle (a saddle riding vehicle) 101 shown in FIG. 1 improves ease of riding using a space between a handle 8 and a seat 115 as a bottom section and achieves a low center of gravity of the vehicle by providing, a so-called underbone vehicle body frame 1. A front wheel (a steered wheel) 102 of the motorcycle 101 is supported by lower end portions of a pair of left and right front forks 19a. The left and right front forks 19a are included in an integrated front fork structure body 19. The front fork structure body 19 is included in a front wheel suspension apparatus 10 of the motorcycle 101.
Referring to FIG. 2 and FIG. 5 together, the front wheel suspension apparatus 10 includes a suspension arm 16 having a rear end portion (a base end portion) connected to a head section 2 of the vehicle body frame 1, a head pipe 12 to which a front end portion (a tip portion) of the suspension arm 16 is connected, the front fork structure body 19 configured to support the front wheel 102, a stem shaft 14 integrally pivotably attached to an upper section of the front fork structure body 19 and steerably inserted through the head pipe 12, and a cushion unit 20 interposed between the head section 2 and the suspension arm 16.
The head section 2 of the vehicle body frame 1 is disposed in a standing-up posture that is inclined to be disposed further forward as it goes upward in a vertical direction. A handle support section 2a is supported by an upper end portion of the head section 2, and a handle post 11 is pivotably (steerably) supported by the handle support section 2a. The handle support section 2a is formed in a cylindrical shape that is inclined to be disposed further forward as a central axis C2 goes downward.

Figure 2:
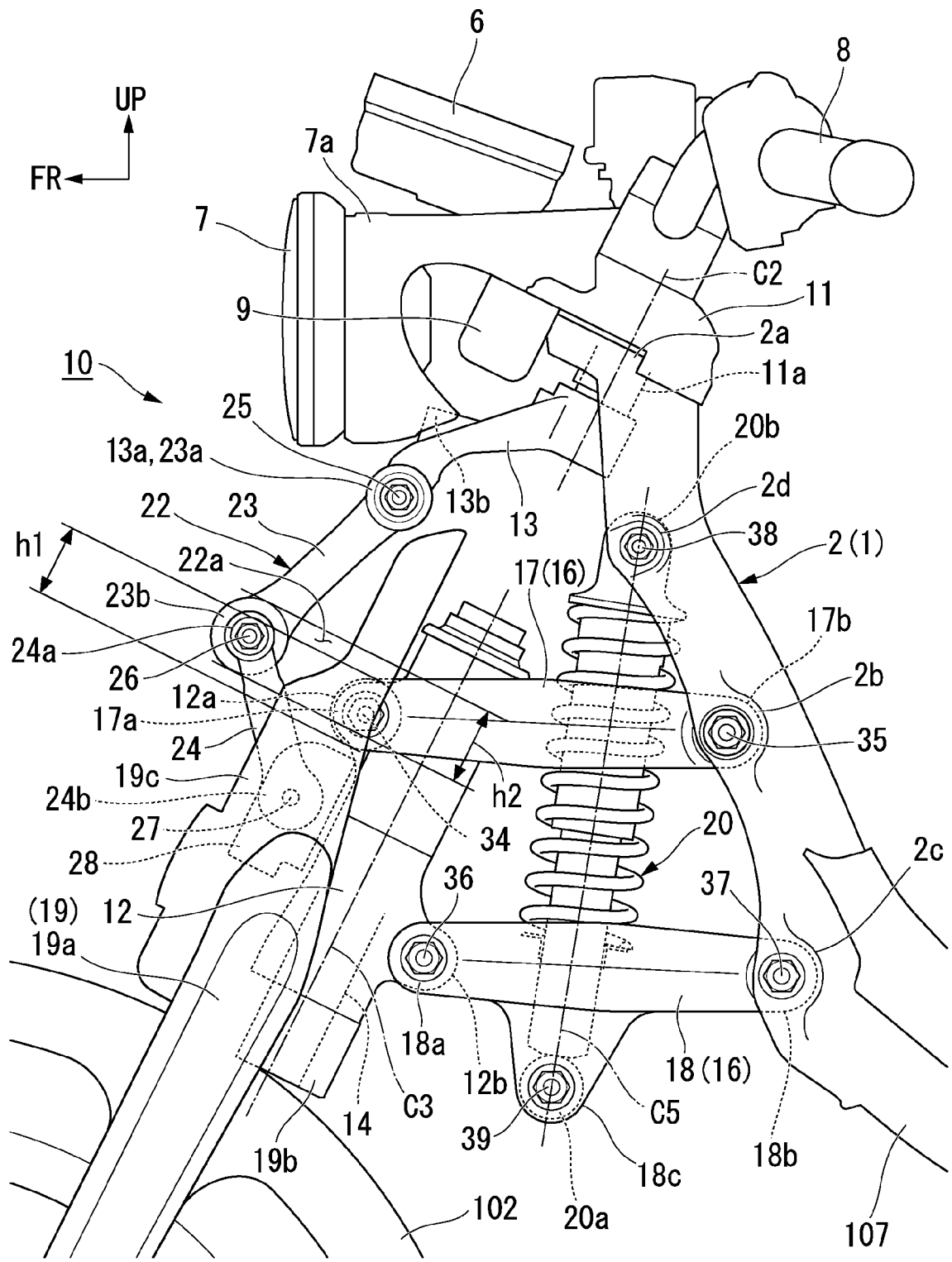
FIG. 2 is a right side view of a front wheel suspension apparatus of the motorcycle.
Figure 3:
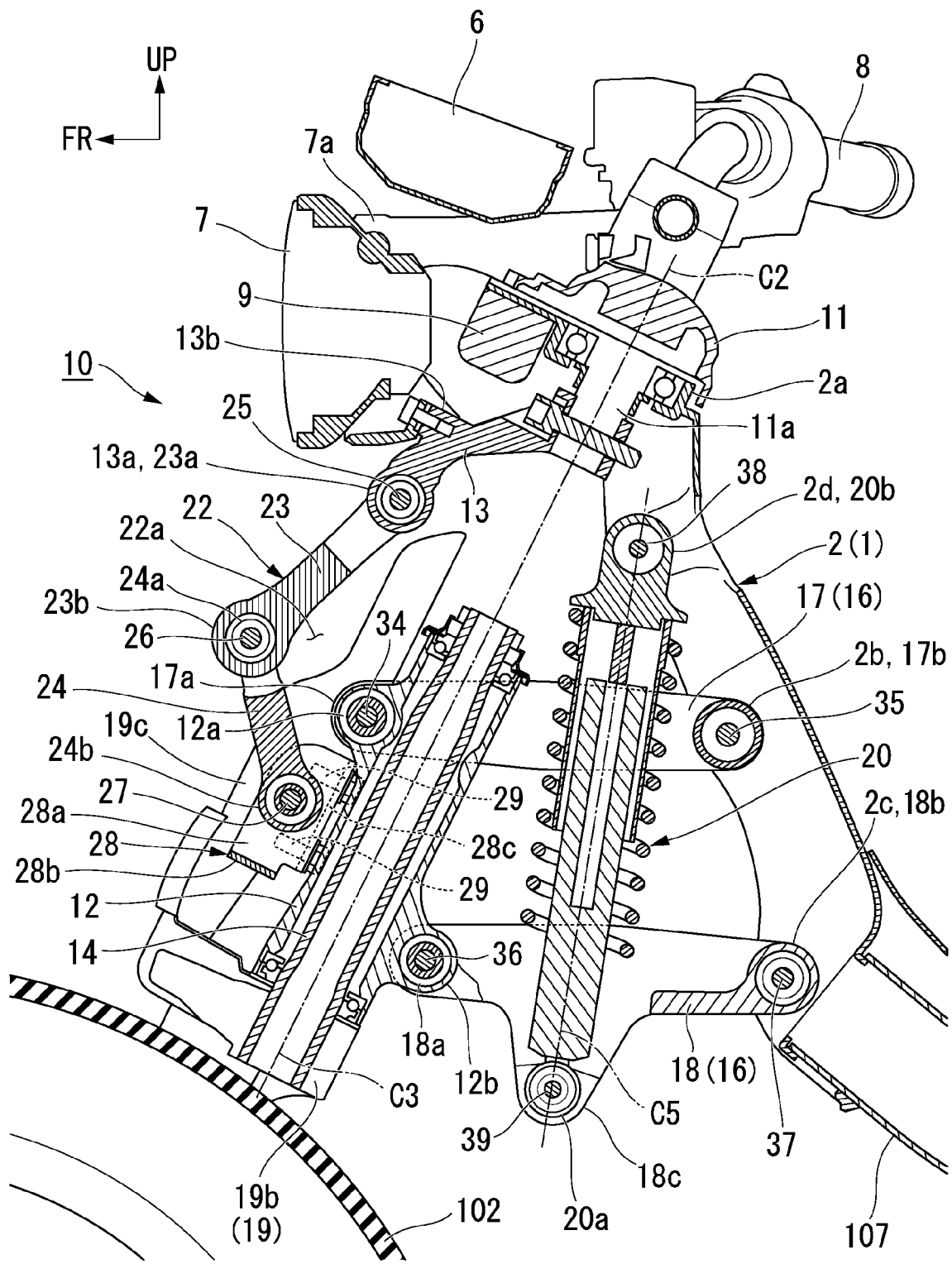
FIG. 3 is a cross-sectional view when a cross section of a lateral center of a vehicle body of the front wheel suspension apparatus is seen from a right side.
Figure 4:
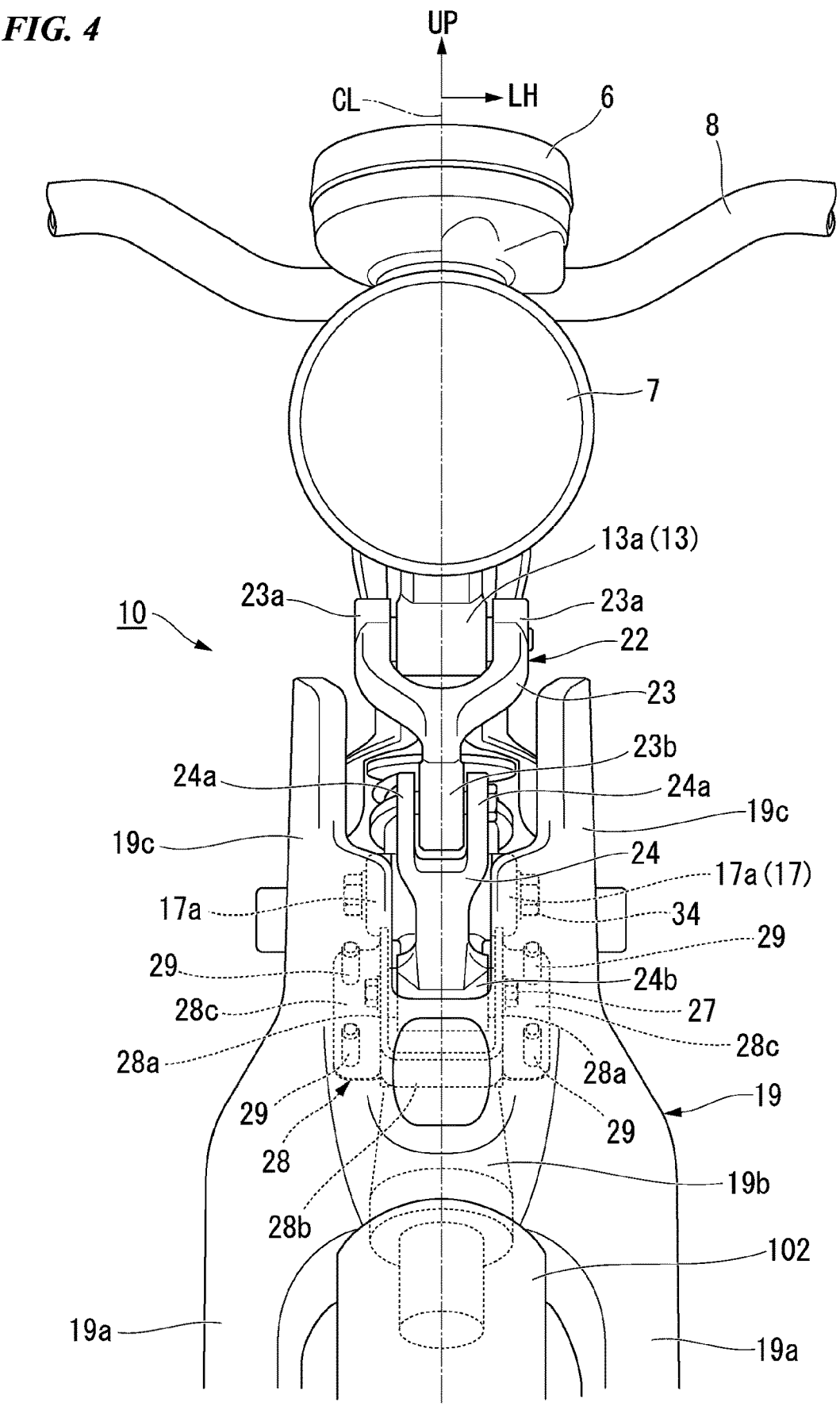
FIG. 4 is a front view of the front wheel suspension apparatus.

A shaft section 11a of the handle post 11 coaxial with the handle support section 2a is inserted through the handle support section 2a. The shaft section 11a is pivotably supported around an axis C2 in the handle support section 2a. The bar type steering handle (hereinafter, may be simply referred to as a handle) 8 is integrally pivotably attached to an upper section of the handle post 11. That is, the handle 8 is pivotably (steerably) supported by the handle support section 2a.
The shaft section 11a of the handle post 11 has a lower end portion protruding downward from the handle support section 2a, and a base end portion of a steering arm 13 is integrally pivotably attached to the lower end portion. An upper end portion of a bending link 22 is connected to a tip portion of the steering arm 13. A lower end portion of the bending link 22 is connected to the front fork structure body 19. The bending link 22 allows vertical movement of the front fork structure body 19 with respect to the handle support section 2a while interlinking pivotal movement of the handle 8 and pivotal movement of the front fork structure body 19. Hereinafter, the central the axis C2 of the handle support section 2a may be referred to as a steering axis.
The bending link 22 includes an upper link 23 and a lower link 24 that are disposed in a V shape protruding forward when seen in a side view. The bending link 22 is bent and extended to reduce and enlarge an included angle between the upper link 23 and the lower link 24 according to vertical movement of the head pipe 12.
An upper end portion 23a of the upper link 23 is swingably connected to a tip portion 13a of the steering arm 13 via an upper connecting shaft 25 in a vehicle width direction. A lower end portion 23b of the upper link 23 is swingably connected to an upper end portion 24a of the lower link 24 via an intermediate connecting shaft 26 in the vehicle width direction. A lower end portion 24b of the lower link 24 swingably connected to a link connecting bracket 28 fixed to an upper front section of the front fork structure body 19 via a lower connecting shaft 27 in the vehicle width direction.
A concave section 22a that is an inner side of the V shape when seen in a side view is formed behind the bending link 22. A front end portion 17a of an upper arm 17 and a front upper connecting section 12a of the head pipe 12 are disposed to face the inside of the concave section 22a from the rear.
The intermediate connecting shaft 26 that is a bent shaft of the bending link 22 is disposed at a height at which they overlap the front end portion 17a of the upper arm 17 in the axial direction of the head pipe 12 and the stem shaft 14. Specifically, in the axial direction, at least a part of the intermediate connecting shaft 26 is disposed within an axial width h1 of the front end portion 17a having a boss shape in the upper arm 17. Alternatively, at least a part of a connecting shaft 34 of the front end portion 17a of the upper arm 17 is disposed within an axial width h2 of the lower end portion 23b having a boss shape in the upper link 23 of the bending link 22.
Referring to FIG. 2 to FIG. 4, the link connecting bracket 28 configured to connect the lower end portion 24b of the lower link 24 integrally includes a pair of left and right sidewall sections 28a, a lower wall section 28b that bridges between lower end portions of the left and right sidewall sections 28a, and a pair of left and right fastening wall sections 28c standing outward from rear end portions of the left and right sidewall sections 28a in the vehicle width direction. An end portion of the connecting shaft 27 arranged in the vehicle width direction is supported by the left and right sidewall sections 28a. The left and right fastening wall sections 28c are detachably fixed to an upper front section of the front fork structure body 19 by a pair of upper and lower fastening bolts 29 directed in the forward/rearward direction of the vehicle. The link connecting bracket 28 is disposed in front of the head pipe 12 and the stem shaft 14 in the forward/rearward direction perpendicular to a central axis C3 of the head pipe 12.

The fork structure body 19 integrally includes the left and right front forks 19a, a cross section 19b configured to connect upper sections of the left and right front forks 19a, and a pair of left and right upward extension sections 19c extending upward from left and right side portions of the cross section 19b.

The bending link 22 allows the vertical movement of the front fork structure body 19 and the front wheel 102 while the handle 8 and the front fork structure body 19 can be interlocked (steered) without any particular play.

Figure 1:
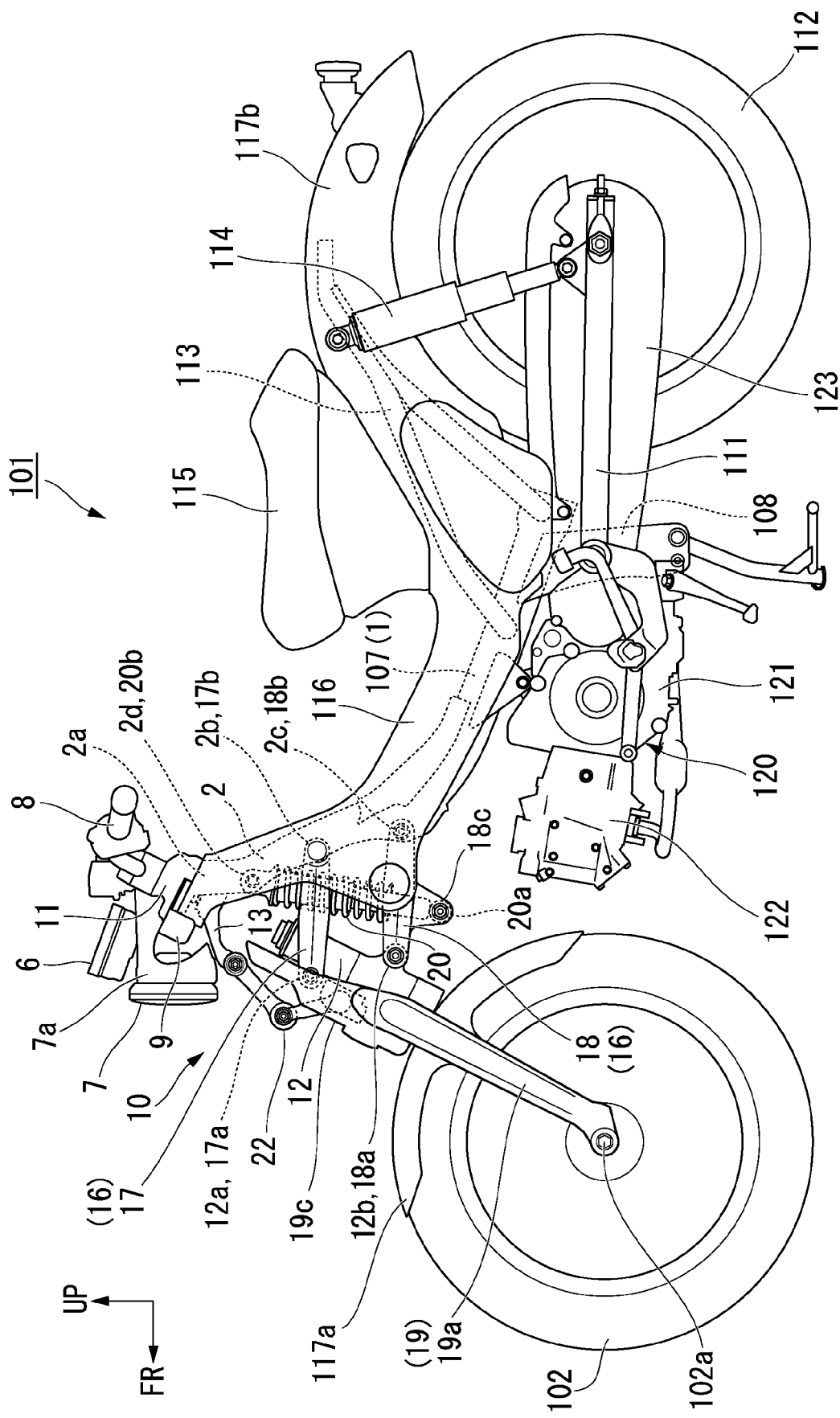
FIG. 1 is a right side view of a motorcycle according to an embodiment of the present invention.

Referring also to FIG. 1, a main frame 107 extends downward and rearward obliquely from a lower end portion of the head section 2. A pivot frame 108 extends downward from a rear end portion of the main frame 107. A front end portion of a swing arm 111 is vertically swingably supported by the pivot frame 108 via a pivot shaft 11a arranged in the leftward/rightward direction (the vehicle width direction). A rear wheel (a driving wheel) 112 of the motorcycle 101 is supported by a rear end portion of the swing arm 111.

A seat frame 113 extends rearward and upward from rear upper sides of the main frame 107 and the pivot frame 108. A pair of left and right cushion units 114 are disposed between the seat frame 113 and a rear section of the swing arm 111. The seat 115 on which an occupant sits is disposed on the seat frame 113.

Reference numeral 116 in the drawings designates a vehicle body cover formed of a synthetic resin and configured to cover the vehicle body from the main frame 107 to the seat frame 113, and reference numeral 117a designates a front fender configured to cover an upper section of the front wheel 102. A rear fender 117b configured to cover the upper section of the rear wheel 112 is continuous with the rear section of the vehicle body cover 116.

Reference numeral 7 in the drawings designates a headlight pivotably supported integrally with the handle 8 in front of the handle 8, reference numeral 7a designates a stay in the headlight 7 extending toward the vehicle body, reference numeral 6 designates a meter unit supported by an upper section of the stay 7a, and reference numeral 9 designates a handle lock disposed in front of the handle support section 2a. A light attachment section 13b configured to fasten and support a lower section of the stay 7a of the headlight 7 is provided on the upper section of the steering arm 13.

An engine 120 that is a prime mover of the motorcycle 101 is mounted below the main frame 107. The engine 120 is, for example, an air-cooling single-cylinder engine, and a rotational axis of a crankshaft (a crank axis) is disposed in the leftward/rightward direction. The engine 120 has a cylinder 122 protruding substantially horizontally forward (specifically, slightly forward and upward) from a front end portion of a crank case 121. The engine 120 can drive the rear wheel 112 via a chain type power transmission mechanism 123.

<Front Wheel Suspension Apparatus>

As shown in FIG. 2 and FIG. 3, the suspension arm 16 of the front wheel suspension apparatus 10 includes the upper arm 17 and a lower arm 18. The upper arm 17 and the lower arm 18 extend substantially in the forward/rearward direction of the vehicle in a state shown in the figures (a state of an empty car 1G of the motorcycle 101). The upper arm 17 and the lower arm 18 are separated from each other and disposed substantially parallel to each other in the upward/downward direction of the vehicle.

The front end portion 17a of the upper arm 17 is swingably connected to the front upper connecting section 12a of the head pipe 12 via the connecting shaft 34 in the vehicle width direction. A rear end portion 17b of the upper arm 17 is swingably connected to an upper arm connecting section 2b of the head section 2 via a connecting shaft 35 in the vehicle width direction.

A front end portion 18a of the lower arm 18 is swingably connected to a lower rear connecting section 12b of the head pipe 12 via a connecting shaft 36 in the vehicle width direction. A rear end portion 18b of the lower arm 18 is swingably connected to a lower arm connecting section 2c of the head section 2 via a connecting shaft 37 in the vehicle width direction.

The front and rear end portions 17a and 17b of the upper arm 17 are disposed in front of the front and rear end portions 18a and 18b of the lower arm 18. The front end portion 17a of the upper arm 17 is disposed in front of the central axis C3 of the head pipe 12 and disposed below an upper end of the head pipe 12. The front end portion 18a of the lower arm 18 is disposed behind the central axis C3 of the head pipe 12 and disposed above a lower end of the head pipe 12.

Referring also to FIG. 5, the upper arm 17 includes a pair of left and right arm main bodies. The pair of left and right arm main bodies are separated from each other in the vehicle width direction, and an upper section of the head pipe 12 and a vertical intermediate section of the cushion unit 20 are disposed therebetween. Further, "intermediate" used in the embodiment has a meaning including a range inward between both ends of an object in addition to a center between both ends of the object.

The lower arm 18 includes a pair of left and right arm main bodies 18c. The pair of left and right arm main bodies 18c are separated from each other in the vehicle width direction, and a lower section of the cushion unit 20 is disposed therebetween. Cushion lower connecting sections configured to connect lower end portions 20a of the cushion unit 20 protrude from lower sections of the left and right arm main bodies 18c.

The cushion unit 20 swingably connects the lower end portions 20a to the lower arm 18 and swingably connects an upper end portion 20b to an upper section of the head section 2 (a cushion upper connecting section 2d). The cushion unit 20 strokes along a central axis (a stroke axis) C5 that bridges between the upper and lower end portions 20a and 20b. The cushion unit 20 strokes and obtains a shock absorbing action according to vertical swinging of the lower arm 18 (in addition to vertical movement of the front wheel 102).

The head pipe 12 is disposed separately below the handle support section 2a. The head pipe 12 is formed in a substantially cylindrical shape, and disposed to be inclined to be located further forward as the central axis C3 goes downward. The head pipe 12 is disposed separately in front of the cushion unit 20. The stem shaft 14 coaxial with the head pipe 12 is inserted through the head pipe 12.

The stem shaft 14 is pivotably supported around an axis in the head pipe 12.

The stem shaft 14 is integrally fixed to an upper section of the front fork structure body 19. The front fork structure body 19 is connected to a lower end portion of the stem shaft 14. The front fork structure body 19 is pivotably (steerably) supported by the head pipe 12 via the stem shaft 14.

Hereinafter, the central axis C3 of the head pipe 12 may be referred to as a steering axis (a stem shaft axis).

An angle of the steering axis C3 with respect to the vertical direction is a caster angle. In the state of the empty car 1G shown in the drawings, the steering axis C3 and the steering axis C2 are substantially coaxial with each other. In both of a direction along the steering axis C3 and a direction along the steering axis C2, an upper end portion of the head pipe 12 and a lower end portion of the handle support section 2a are separated from each other. That is, the head pipe 12 and the handle support section 2a do not overlap each other in the upward/downward direction.

The front wheel 102 is steered to the same angle as the steering angle of the handle 8. Accordingly, a pivoting operation (a handle operation) of the handle 8 and a pivoting operation (a steering action) of the front fork structure body 19 are substantially linearly interlinked to each other.

The left and right front forks 19a extend forward and downward from left and right sides of the front wheel 102 from both sides of a lower end of the head pipe 12 toward a front wheel axle 102a (see FIG. 1). The left and right front forks 19a are disposed to be inclined to be disposed further forward as they go downward. Left and right side portions of the front wheel axle 102a are supported by lower end portions of the left and right front forks 19a, and the front wheel 102 is axially supported by the lower end portions of the left and right front forks 19a.

Regarding the front wheel suspension apparatus 10, when the front wheel 102 moves upward relative to the vehicle body frame 1 due to deceleration or the like with respect to the state of the empty car 1G as shown in the drawings, the front fork structure body 19 and the head pipe 12 similarly moves upward and the suspension arm 16 swings upward.

Here, the lower end portion 20a of the cushion unit 20 is displaced upward to compress the cushion unit 20 according to swinging of the lower arm 18. When the head pipe 12 is moved upward, the bending link 22 is bent to decrease an included angle between the upper link 23 and the lower link 24. Accordingly, a state in which the front fork structure body 19 and the handle 8 are integrally pivotable is maintained while allowing relative movement therebetween.

Regarding the front wheel suspension apparatus 10, when the front wheel 102 is moved downward relative to the vehicle body frame 1 due to acceleration or the like with respect to a state of the empty car 1G as shown in the drawings, the front fork structure body 19 and the head pipe 12 similarly moves downward and the suspension arm 16 swings downward.

Here, the lower end portion 20a of the cushion unit 20 is displaced downward to expand the cushion unit 20 according to swinging of the lower arm 18. When the head pipe 12 is moved downward, the bending link 22 is expanded to increase an included angle between the upper link 23 and the lower link 24. Even at this time, a state in which the front fork structure body 19 and the handle 8 can be integrally pivoted is maintained while allowing relative movement therebetween.

As described above, the steering structure for a saddle riding vehicle according to the embodiment includes the vehicle body frame 1, the suspension arm 16 extending forward from the front section (the head section 2) of the vehicle body frame 1, the head pipe 12 supported by the tip portion (the front end portions 17a and 18a) of the suspension arm 16, the stem shaft 14 pivotably inserted through the head pipe 12, the front fork structure body 19 integrally pivotably connected to the lower end portion of the stem shaft 14 and configured to support the steered wheel (the front wheel 102), the head pipe for a handle (the handle support section 2a) that is supported by the head section 2 of the vehicle body frame 1 and that is disposed above the head pipe 12, the handle 8 steerably supported by the handle support section 2a, and the bending link 22 configured to transmit the steering operation of the handle 8 toward the front wheel 102, wherein the bending link 22 has an upper end portion that is connected to a side of the handle 8 and a lower end portion that is connected to a side of the front fork structure body 19.

According to the configuration, since the head pipe for a handle is disposed above the head pipe 12 configured to steerably support the fork member, in comparison with the case in which the head pipe for a handle is disposed behind the head pipe 12 (the case in which positions in the upward/downward direction between the head pipe 12 and the head pipe for a handle overlap each other), there is no need to greatly offset the head pipe 12 and the head pipe for a handle in the forward/rearward direction, and the steering structure having a compact structure in the forward/rearward direction and can be easily mounted in a small-size vehicle.

In the steering structure for a saddle riding vehicle, the lower end portion of the bending link 22 is connected to the front fork structure body 19 in front of the stem shaft 14.

According to the configuration, for example, in the configuration in which the bending link 22 is connected to the front fork structure body 19 behind the stem shaft 14, while the head pipe 12 is offset forward in order to secure a space for connecting to the bending link 22. On the other hand, according to the configuration, since the bending link 22 is connected to the front fork structure body 19 in front of the stem shaft 14, the head pipe 12 can be disposed in a compact space by connecting the bending link 22 to the front fork structure body 19 in front of the stem shaft 14.

In the steering structure for a saddle riding vehicle, the link connecting bracket 28 detachably attached to the front fork structure body 19 is provided, and the link connecting bracket 28 is connected to the lower end portion of the bending link 22.

According to the configuration, a degree of freedom of the connecting structure and the assembly method of the bending link 22 with respect to the front fork structure body 19 can be increased.

In the steering structure for a saddle riding vehicle, the handle 8 is attached to the upper end portion of the stem shaft for a handle (the shaft section 11a) steerably inserted through the handle support section 2a, the steering arm 13 extending forward is provided on the lower end portion of the shaft section 11a, the upper end portion of the bending link 22 is connected to the steering arm 13, and the lower end portion of the bending link 22 is connected to the front fork structure body 19 in front of the stem shaft 14.

According to the configuration, since the upper end portion of the bending link 22 is connected to the steering arm 13 extending forward from the lower end portion of the stem shaft for a handle (the shaft section 11a) and the lower end portion of the bending link 22 is connected to the front fork structure body 19 in front of the stem shaft 14, a vertical stroke of the front wheel 102 is easily secured, the bending link 22 is easily reduced in size, and a compact structure of the vehicle can be achieved.

In the steering structure for a saddle riding vehicle, the support section (the light attachment section 13b) of the headlight 7 is provided on the steering arm 13.

According to the configuration, since the headlight 7 is supported using the steering arm 13 extending forward, reduction in the number of parts due to rationalization can be achieved.

In the steering structure for a saddle riding vehicle, the suspension arm 16 includes the upper arm 17 and the lower arm 18, the bending link 22 is formed in a bent shape protruding forward when seen in a side view, and the front end portion 17*a* of the upper arm 17 is pivotably connected to the front upper connecting section 12*a* of the head pipe 12 and is disposed so as to face the concave section 22*a* formed by the bending link 22 when seen in a side view.

According to the configuration, since the front end portion 17*a* of the upper arm 17 is disposed to face the inside of the concave section 22*a* formed by the bending link 22, the bending link 22 can be disposed close to the head pipe 12 using a dead space formed by the bending link 22, and a compact structure of the vehicle can be achieved.

In the steering structure for a saddle riding vehicle, the bending link 22 connects the upper link 23 and the lower link 24 using the bent shaft (the intermediate connecting shaft 26), and the intermediate connecting shaft 26 is disposed at the height at which it overlaps the front end portion 17*a* of the upper arm 17 in the axial direction of the stem shaft 14.

According to the configuration, since a periphery of the bent shaft having a maximum bending depth of the bending link 22 and the front end portion 17*a* of the upper arm 17 connected to the front upper connecting section 12*a* of the head pipe 12 are disposed at a height at which they overlap each other in the axial direction of the stem shaft 14, it becomes easier to dispose the bending link 22 closer to the head pipe 12, and a compact structure of the vehicle can be achieved.

In addition, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to a one-front-wheeled and two-rear-wheeled vehicle) or a four-wheeled vehicle are also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A steering structure for a saddle riding vehicle comprising:
    a vehicle body frame;
    a suspension arm extending forward from a front section of the vehicle body frame;
    a head pipe supported by a tip portion of the suspension arm;
    a stem shaft pivotably inserted through the head pipe;
    a fork member integrally pivotably connected to a lower end portion of the stem shaft and configured to support a steered wheel;
    a head pipe for a handle that is supported by a front section of the vehicle body frame and that is disposed above the head pipe;
    a steering handle steerably supported by the head pipe for a handle; and
    a bending link configured to transmit a steering operation of the steering handle toward the steered wheel,
    wherein the bending link has an upper end portion connected to a side of the steering handle and a lower end portion connected to a side of the fork member,
    the steering handle is attached to an upper end portion of a stem shaft for a handle steerably inserted into the head pipe for a handle,
    an arm section extending forward is provided on a lower end portion of the stem shaft for a handle,
    the upper end portion of the bending link is connected to the arm section, and
    the lower end portion of the bending link is connected to the fork member in front of the stem shaft.

2. The steering structure for a saddle riding vehicle according to claim 1, wherein the lower end portion of the bending link is connected to the fork member in front of the stem shaft.

3. The steering structure for a saddle riding vehicle according to claim 1, wherein a link connecting bracket detachably attached to the fork member is provided, and
    the lower end portion of the bending link is connected to the link connecting bracket.

4. The steering structure for a saddle riding vehicle according to claim 1, wherein a support section of a headlight is provided on the arm section.

5. The steering structure for a saddle riding vehicle according to claim 1, wherein the suspension arm comprises an upper arm and a lower arm,
    the bending link is formed in a bent shape protruding forward when seen in a side view, and
    a front end portion of the upper arm is pivotably connected to a front connecting section of the head pipe and is disposed so as to face a concave section formed by the bending link when seen in a side view.

6. The steering structure for a saddle riding vehicle according to claim 5, wherein the bending link connects an upper link and a lower link at a bent shaft, and
    the bent shaft is disposed at a height at which it overlaps a front end portion of the upper arm in an axial direction of the stem shaft.

\* \* \* \* \*